Nov. 15, 1949     H. W. SPRINGER     2,488,345
RECIPROCABLE CARRIAGE AND MECHANISM
FOR RECIPROCATING IT
Original Filed March 26, 1945     3 Sheets-Sheet 3

Inventor
Herbert W. Springer

Clarence A. O'Brien
and Harvey B. Jacobson
Attorneys

Patented Nov. 15, 1949

2,488,345

UNITED STATES PATENT OFFICE 2,488,345

RECIPROCABLE CARRIAGE AND MECHANISM FOR RECIPROCATING IT

Herbert W. Springer, Quakertown, Pa.

Original application March 26, 1945, Serial No. 584,919. Divided and this application November 29, 1948, Serial No. 62,586

6 Claims. (Cl. 74—27)

This invention relates to cloth spreading apparatus of the type described in my co-pending application Serial No. 584,919, filed March 26, 1945, abandoned, of which this application is a division.

The primary object of this invention is to drive the carriage of a cloth spreading device of the type above referred to, and alternately cause the carriage to move from one end of the cloth laying table to the opposite end thereof without manual manipulation.

Another object is to regulate the length of travel of the carriage on the cloth receiving table, so that the width of a pile of cloth laid on the table may be governed to suit varying requirements.

A further object is to avoid injury to the cloth being laid on the table through the exercise of undue stress thereon during the laying operation.

The above and other objects may be attained by employing this invention which embodies among its features friction drive rollers for the carriage of the cloth laying apparatus arranged alternately to engage the upper and lower flanges of parallel channel members attached to the table upon which the cloth is being laid, adjacent opposite side edges thereof, and means at opposite ends of the length of movement of the carriage for altering the positions of the drive rollers to cause them alternately to engage the upper and lower flanges of the channel members.

Other features include means carried by the carriage to impart rotation to the drive rollers and move the carriage to and fro on the table.

Still other features include a table, a carriage mounted on the table to move longitudinally thereof, a channel member fixed to the table adjacent each side edge thereof, a friction roller on each side of the carriage, each friction roller lying between the flanges of the channel member on its respective side of the table, means carried by the carriage to drive the friction rollers in unison, yielding means on the carriage to hold the friction rollers in engagement with the upper flanges of their respective channel members, means on the carriage to move the friction rollers against the effort of the yielding means and hold them in engagement with the lower flanges in the respective channels and stops on the table for actuating the last named means alternately to cause the friction rollers to engage and disengage the upper and lower flanges of the channel members.

In the drawings, Figure 1 is a fragmentary side view of a cloth laying table showing a conventional cloth laying carriage thereon equipped with this improved drive mechanism;

Figure 4 is an enlarged sectional view taken substantially along the line 4—4 of Figure 1.

Figure 3:
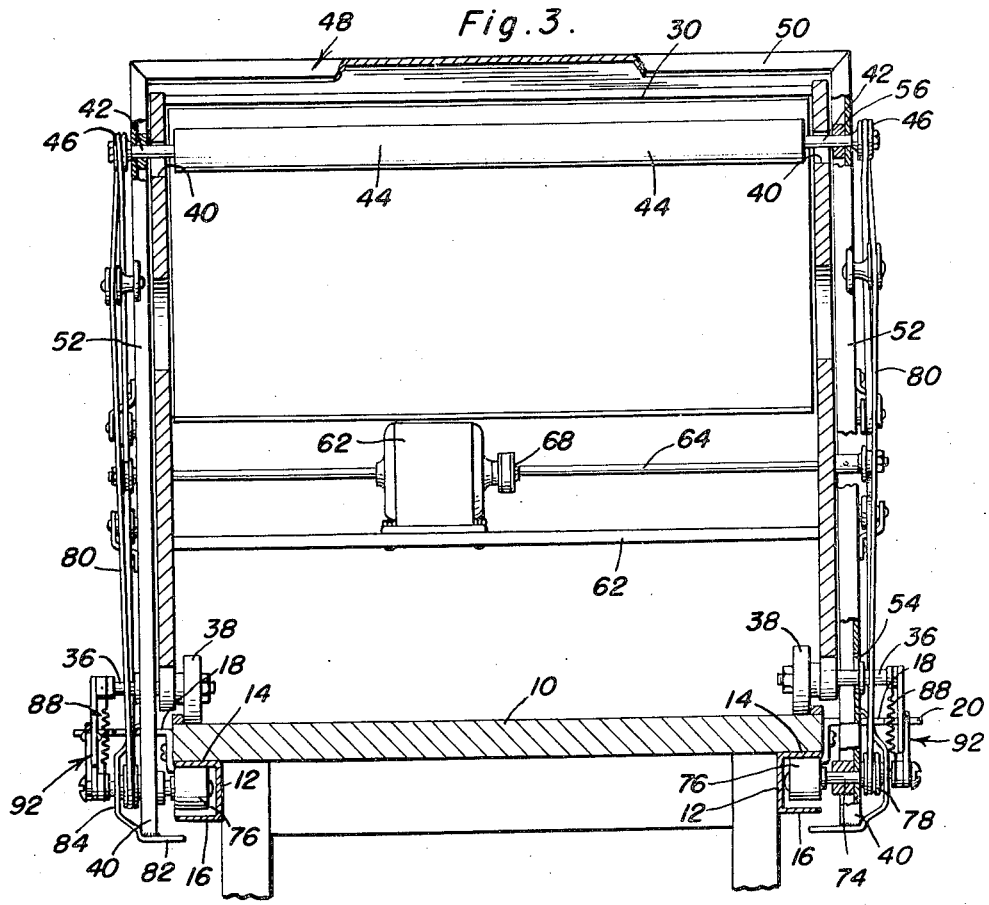
Figure 3 is a sectional view taken substantially along the line 3—3 of Figure 1.
Figure 5:
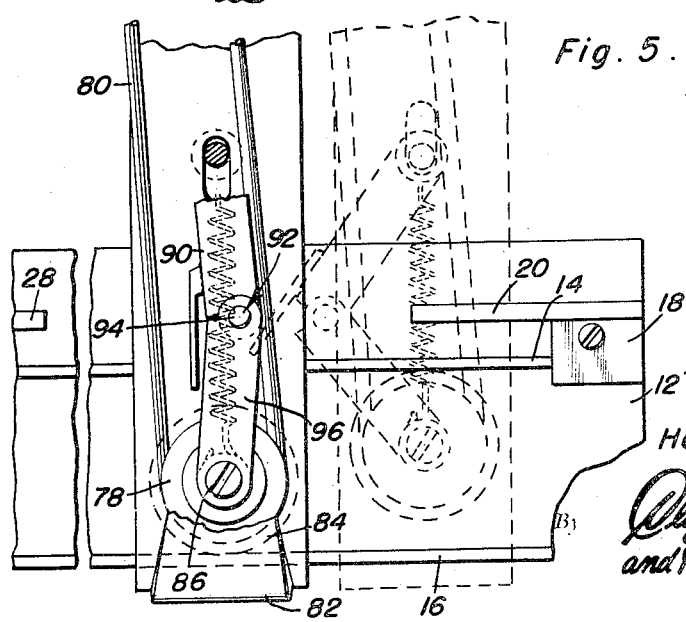
Figure 5 is a fragmentary enlarged side view of the structure illustrated in Figure 4, illustrating in broken lines the manner in which reversal of the movement of the carriage is attained.

Referring to the drawings in detail, a conventional cloth laying table 10 is provided along opposite side edges with channel members 12, the upper and lower flanges 14 and 16 of which project outwardly toward opposite sides of the table as will be readily understood upon reference to Figure 3. Fixed to the upper flange 14 of each channel 12 adjacent one end of the table is a stop member 18 carrying a tongue 20 which projects toward the center of the table as will be readily understood upon reference to Figure 1. Formed in each channel 12 adjacent the end opposite that carrying the stop 18 is an elongated longitudinal slot 22 for the reception of a bolt 24 by means of which a stop member 26 is adjustably coupled to its respective channel. Like the stop members 18, the stop members 26 are provided with tongues 29 which extend toward the tongues 20, as will be readily understood upon reference to Figure 1.

Mounted on the table 10 for longitudinal movement therealong between the stop members 18 and 26 is a carriage 30, one end of which is supported on rollers 32 which are mounted for rotation about suitable bearing studs 34. Studs 36 are fixed in the carriage adjacent its opposite end, and rotatably supported thereon are rollers 38 which correspond to the rollers 32 previously referred to. It will thus be seen that the carriage 30 will be supported to move to and fro in a rectilinear path above the table. As illustrated in Figure 3 the studs 36 carrying the rollers 38 extend outwardly beyond the sides of the carriage for a purpose to be more fully hereinafter explained. Each side of the carriage above its respective stud 36 is provided with an elongated vertical slot 40 through which the trunnions 42 of a suitable cloth feeding roller 44 extend. Fixed to the trunnions 42 adjacent their outer ends are drive pulleys 46, so that when the pulleys are rotated, the cloth feed roller 44 will move in unison therewith.

Mounted for vertical sliding movement on the carriage 30 is a frame designated generally 48 comprising a cross bar 50 having depending legs 52 which extend downwardly along opposite sides of the carriage 30 and are provided near their lower ends with elongated longitudinal slots 54 through which the studs 36 project. Carried adjacent the upper ends of the legs 52 are journal bearings 56 which register with the slots 40 in the carriage and rotatably receive the trunnions 42 of the cloth feed roller 44. Rotatably supported in suitable brackets 58 carried by the legs 52 of the frame 48 intermediate their upper and lower ends are guide pulleys 60, and mounted on a platform 62 between the legs of the frame 44 is a prime mover 63 such as an electric motor. A main drive shaft 64 is mounted in the carriage to rotate about a horizontal axis, and carried at opposite ends of this shaft are drive pulleys 66 which align with the guide pulleys 60 previously referred to. A main drive pulley 68 is fixed to the shaft 64 intermediate its ends, and has driving connection with the prime mover 63 through the medium of an endless drive belt 70. Mounted on each leg of the frame 44 between the uppermost guide pulley 60, and the feed roller drive pulley 46 is a guide pulley 72.

Journalled in each leg 52 of the frame 48 adjacent the lower end thereof is a stub shaft 74 which projects inwardly toward the center of the table 10, and carries adjacent its inner end a friction drive roller 76. Each friction drive roller 76 enters a channel 12 between the flanges 14 and 16 as will be readily understood upon reference to Figure 3, and mounted on each stub shaft 74 adjacent its end remote from the friction drive roller 76 is a drive pulley 78. Trained over the drive pulleys 66, guide pulleys 60 and 72, drive pulleys 46 and 78 on each side of the carriage is an endless drive belt 80. It will thus be seen that when the prime mover 63 is set into operation rotary motion will be imparted to the cloth feed roller 44, and to the friction drive rollers 76.

As illustrated in Figure 4 each leg 52 carries at its lower end a stop member 82 which projects inwardly and underlies the lowermost flange 16 of an adjacent channel member 12, and the opposite end of each stop member 82 is bent upwardly as at 84 to form a support for an outwardly extending stud 86 to which is coupled one end of a retractile coil spring 88, while the opposite end thereof is coupled to the stub shaft 36 on its respective side of the device. It will thus be seen that the frame 48 will be urged upwardly under the influence of the spring 88 to move the friction drive rollers 76 into contact with the upper flanges 14 of the channel members 12. Pivotally connected adjacent its upper end to the stub shaft 36 is the upper link 90 of an elbow joint designated generally 92. The lower end of said link 90 is pivotally coupled as at 94 to the upper end of a lower link 96 of the elbow joint 92, the lower end of which is pivotally connected to the stud 86. It will thus be seen that when the elbow joints 92 are extended against the effort of the springs 88, the drive rollers 76 will be moved downwardly into engagement with the bottom flanges 16 of the channel members 12. The pivotal junctions of the elbow joints 92 lie in a horizontal plane with the tongues 20 and 28 of the stop members 18 and 26, and it will thus be seen that as the carriage 30 moves in its rectilinear path along the table, the pivotal junctions 94 of the elbow joints 92 will alternately be engaged by the tongues 20, thus to shift the frame 48 vertically on the carriage and alternately move the friction drive rollers 76 into engagement with the top and bottom flanges 14 and 16 respectively of the channel members 12. In this way it will be evident that the carriage will be automatically given a to and fro motion in a rectilinear path above the table, so that a cloth supply carried by the carriage may be transferred to the table in successive folds.

Figure 1:
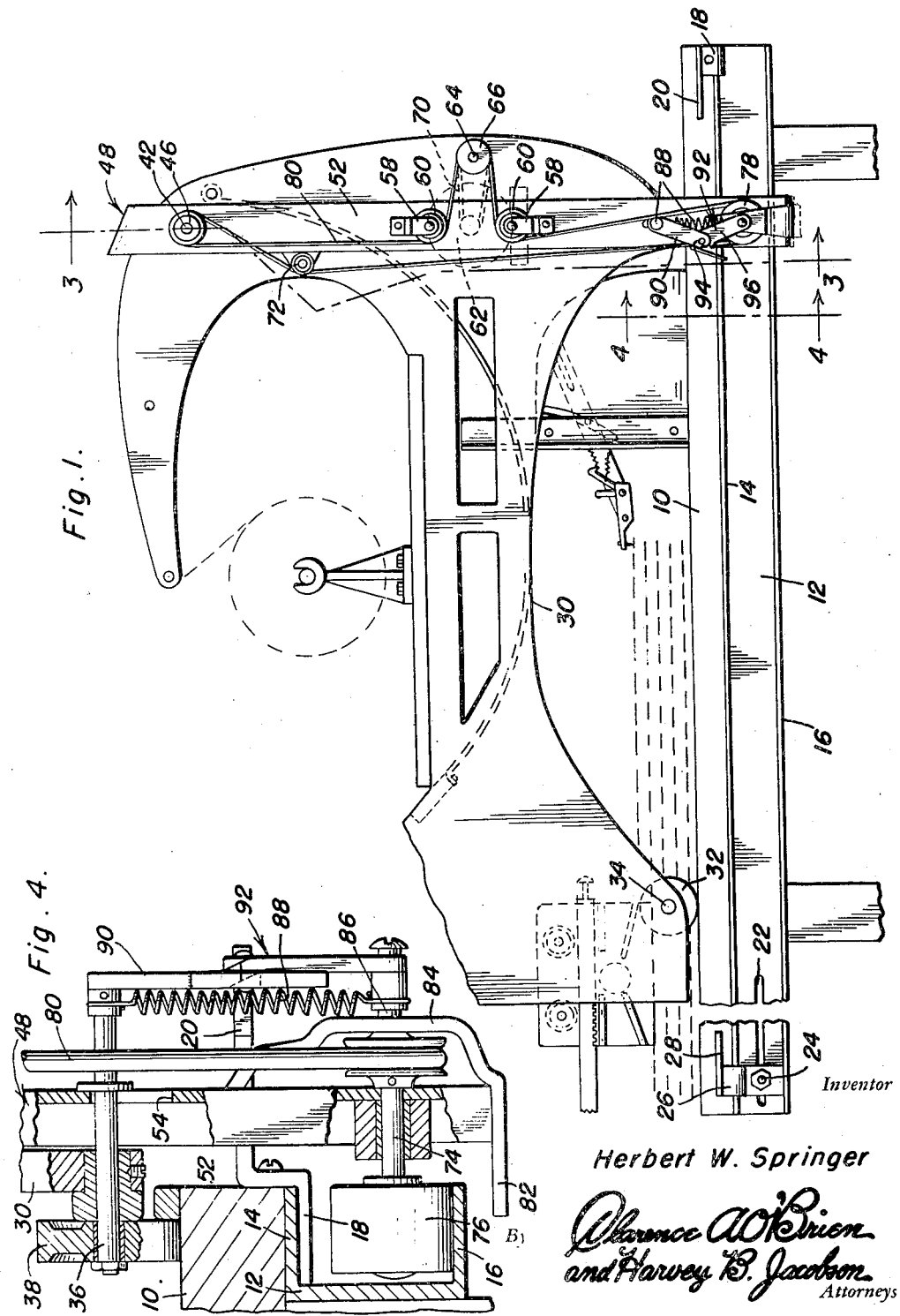
Figure 2:
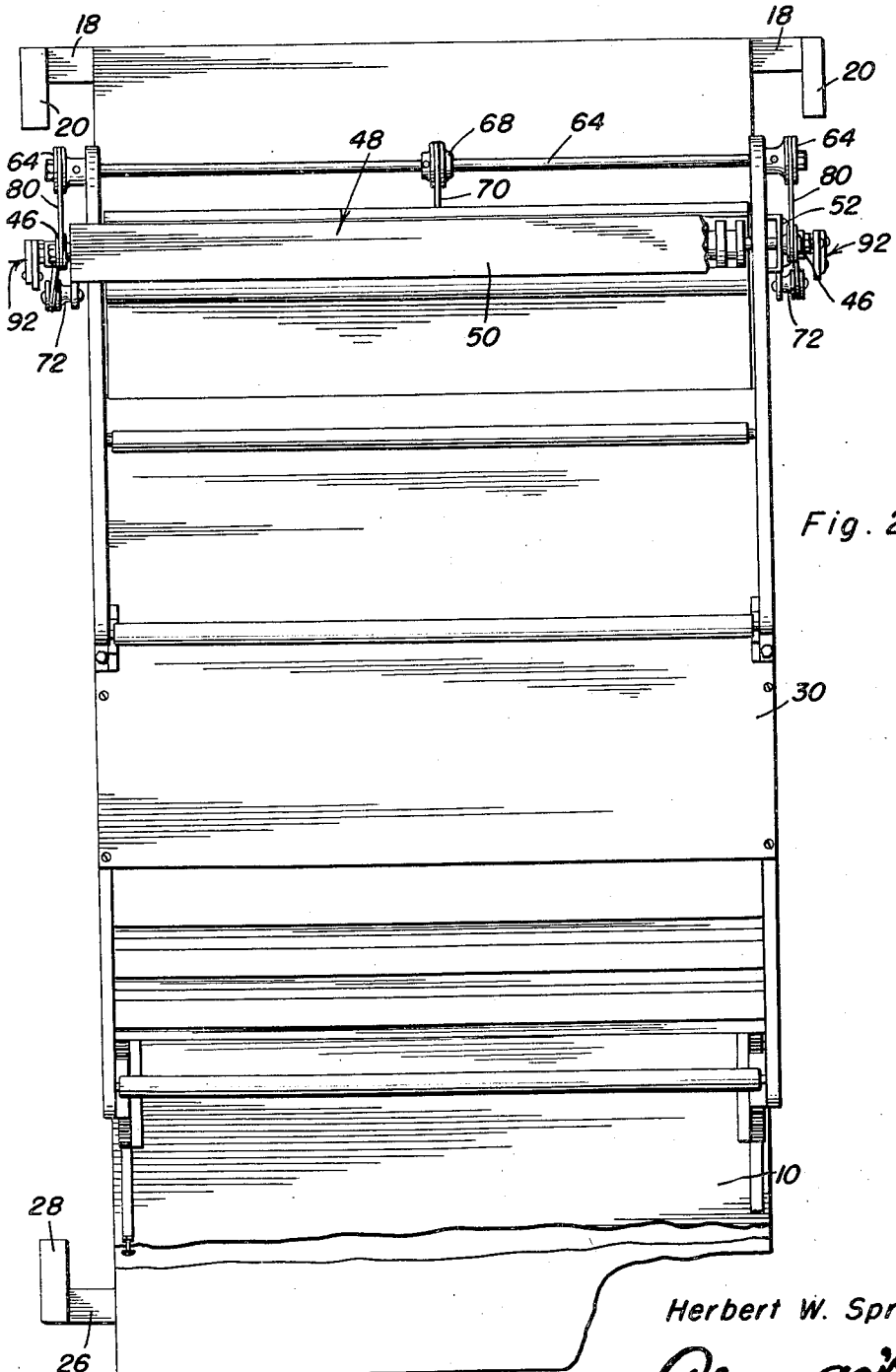
Figure 2 is a top plan view of the structure illustrated in Figure 1.

In use it will be understood that cloth to be piled is deposited on the carriage 30 and fed over the feed roller 44 and through suitable cloth tensioning mechanism onto the table as suggested by the broken lines in Figure 1. The carriage is moved to and fro over the top of the table and above the cloth pile in order to effect the folding operation. With the prime mover 63 set into operation, the pulleys 78 will be driven by the drive belts 80 to rotate the friction rollers 76 in one direction. By the alternate shifting of the frame vertically relative to the carriage, it is obvious that the friction rollers 76 will alternately be moved into contact with the top flanges 14 and the bottom flanges 16 of the channel members 12 by the engagement of the tongues 20 and 28 with the elbow joints 92 and consequently the direction of movement of the carriage in its rectilinear path will be reversed.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. In a cloth piling machine of the type comprising a table and a carriage mounted to move in a rectilinear path above said table, means for moving said carriage to and fro in said rectilinear path comprising a channel member having horizontal flanges fixed to the table adjacent each side of the rectilinear path, drive rollers mounted on the carriage to move vertically relative thereto, said rollers entering the channel members between the horizontal flanges, means carried by the carriage for driving said drive rollers, means on the carriage to shift said drive rollers vertically into engagement with the top or bottom flanges of the channel members and stops carried by the table adjacent opposite ends of the rectilinear path for engaging the drive roller shifting means and shifting the rollers to reverse the direction of movement of the carriage.

2. In a cloth piling machine of the type comprising a table and a carriage mounted to move in a rectilinear path above said table, means for moving said carriage to and fro in said rectilinear path comprising a channel member having horizontal flanges fixed to the table adjacent each side of the rectilinear path, a frame mounted on the carriage to move vertically, a drive rollers mounted in the frame, said drive rollers entering the channel members between the horizontal flanges, means carried by the carriage for driving the drive rollers, means carried by the carriage to shift the frame vertically and move the drive rollers into engagement with the top or bottom flanges of the channel members and stops carried by the table adjacent opposite ends of the rectilinear path for engaging the frame shifting means and shifting the drive rollers to reverse the direction of movement of the carriage.

3. In a cloth piling machine of the type comprising a table and a carriage mounted to move in a rectilinear path above said table, means for moving said carriage to and fro in said rectilinear path comprising a channel member having horizontal flanges fixed to the table adjacent each side of the rectilinear path, a frame mounted on the carriage to move vertically, drive rollers mounted in the frame, said drive rollers entering the channel members between the horizontal flanges, means carried by the carriage for driving the drive rollers, yielding means coupled to the carriage and to the frame for holding said frame raised and the drive rollers in contact with the top flanges of the channel members and means connected with the frame and with the carriage to move and hold the frame downwardly against the effort of the yielding means and the drive rollers against the bottom flanges of the channel members.

4. In a cloth piling machine of the type comprising a table and a carriage mounted to move in a rectilinear path above said table, means for moving said carriage to and fro in said rectilinear path comprising a channel member having horizontal flanges fixed to the table adjacent each side of the rectilinear path, a frame mounted on the carriage to move vertically, drive rollers mounted in the frame, said drive rollers entering the channel members between the horizontal flanges, means carried by the carriage for driving the drive rollers, yielding means coupled to the carriage and to the frame for holding said frame raised and the drive rollers in contact with the top flanges of the channel members and means connected with the frame and with the carriage to move and hold the frame downwardly against the effort of the yielding means and the drive rollers against the bottom flanges of the channel members, and stops carried by the table adjacent opposite ends of the rectilinear path to engage the frame moving and holding means alternately to move it into frame raising and lowering position.

5. In a cloth piling machine of the type comprising a table and a carriage mounted to move in a rectilinear path above said table, means for moving said carriage to and fro in said rectilinear path comprising a channel member having horizontal flanges fixed to the table adjacent each side of the rectilinear path, a frame mounted on the carriage to move vertically, drive rollers mounted in the frame, said drive rollers entering the channel members between the horizontal flanges, means carried by the carriage for driving the drive rollers, yielding means coupled to the carriage and to the frame for holding said frame raised and the drive rollers in contact with the top flanges of the channel members, and an elbow joint connected to each side of the carriage and to each side of the frame to move and hold said frame downwardly against the effort of the yielding means and the drive rollers against the bottom flanges of the channel members.

6. In a cloth piling machine of the type comprising a table and a carriage mounted to move in a rectilinear path above said table, means for moving said carriage to and fro in said rectilinear path comprising a channel member having horizontal flanges fixed to the table adjacent each side of the rectilinear path, a frame mounted on the carriage to move vertically, drive rollers mounted in the frame, said drive rollers entering the channel members between the horizontal flanges, means carried by the carriage for driving the drive rollers, yielding means coupled to the carriage and to the frame for holding said frame raised and the drive rollers in contact with the top flanges of the channel members, and an elbow joint connected to each side of the carriage and to each side of the frame to move and hold said frame downwardly against the effort of the yielding means and the drive rollers against the bottom flanges of the channel members, and stops carried by the table adjacent opposite ends of the rectilinear path for engaging the elbow joints alternately to move them into frame raising and lowering position.

HERBERT W. SPRINGER.

No references cited.